Sept. 29, 1970  W. B. WILBANKS  3,531,155
PROTECTIVE DEVICE FOR WINDSHIELDS AND THE LIKE
Filed July 8, 1968

INVENTOR.
WILBUR B. WILBANKS
BY
ATTORNEYS

United States Patent Office 3,531,155
Patented Sept. 29, 1970

3,531,155
PROTECTIVE DEVICE FOR WINDSHIELDS
AND THE LIKE
Wilbur B. Wilbanks, 3104 Southwest 45,
Oklahoma City, Okla. 73119
Filed July 8, 1968, Ser. No. 743,094
Int. Cl. B60j 11/00
U.S. Cl. 296—95     2 Claims

ABSTRACT OF THE DISCLOSURE

Apparatus which is readily attachable to a windshield or such for the purpose of shielding it from inclement weather during periods of non-use, the apparatus consisting of a suitable cover panel enclosure for placement on an area of glass and having a handle affixed externally with suction means affixed internally to provide adherence to the glass and maintain the enclosure in place.

BACKGROUND OF THE INVENTION

Field of the invention

The invention relates generally to windshield protection devices and, more particularly, but not by way of limitation, it relates to a readily detachable device for protecting a windshield from deposition of ice, sleet, and the like.

Description of the prior art

The prior art includes various types of plate-like devices, generally transparent materials, which are intended for positioning on a windshield, and which may be positioned and held by such as suction cup means. However, these devices generally utilize internally disposed heating elements and their express purpose is for use in defrosting the windshield to enable the driver's improved vision while operating a motor vehicle or such machine. Some other types of windshield attachments do not utilize electrical heating means but rely solely upon certain directed air currents buffeting within an enclosure means to effect a defrosting action. All of such devices are intended for use while the automobile or such machine is moving and, as a necessary attribute of their essence, the devices are designed for relatively secure affixure and not ready detachability.

SUMMARY OF THE INVENTION

The present invention contemplates a windshield protection device which may be manually affixed to a windshield during parking periods in inclement weather conditions. In a more limited aspect, the invention consists of a cover panel enclosure of preselected size which can be positioned over a desired area of windshield or the like to protect it from snow, sleet and the like. A handle is affixed to the enclosure outer surface while suction cups devices are affixed to the inside in position for adherence to the protected portion of windshield. The invention also includes specific forms of suction cup releasing mechanisms which enable easy releasability of the suction cups from their vacuum adhering dispositions.

Therefore, it is an object of the present invention to provide a windshield protection device which contributes to greater driving safety in winter weather conditions.

It is also an object of the invention to provide a snow and ice protector which is of rugged design and which can be readily stored in an accessible yet non-interfering area of the standard automobile for occasional use as required.

Finally, it is an object of the present invention to provide a windshield protection device which will preserve an area of windshield for visibility so that the driver can move off immediately without awaiting a defrosting period during which the automobile heating system adjusts to necessary operating temperatures.

Other objects and advantages of the invention will be evident from the following detailed description when read in conjunction with the accompanying drawing which illustrate the invention.

DESCRIPTION OF THE PREFERRED EMBODIMENT

Figure 1:
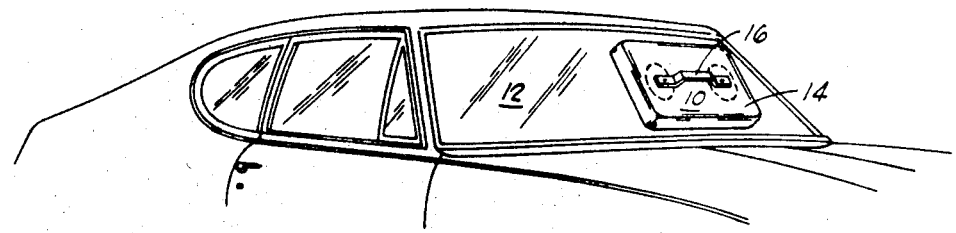
FIG. 1 is a perspective view of a protector device as it may be positioned on an automobile windshield.
Figure 2:
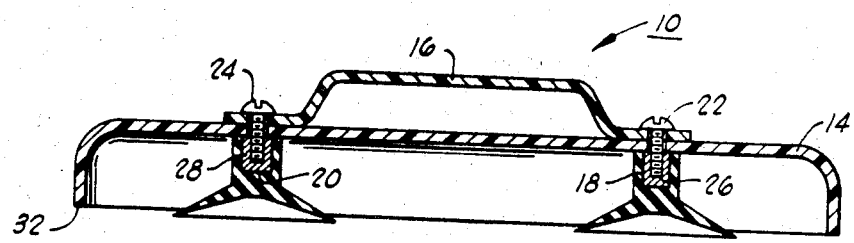
FIG. 2 is a cross-section vertically through the protection device.

As shown in FIG. 1, the protection device 10 is positioned on an automobile windshield 12 and positioned generally over the area which the driver would require for best visibility. As shown also in FIG. 2, the protection device 10 consists of a cover panel 14 having a handle 16 affixed centrally thereof. A pair of suction cups 18 and 20 are secured to the inside of cover panel 14 for the purpose of being made to adhere to the windshield 12. It should be understood that possibly one suction cup or a greater plurality of such cups may be employed for specific applications; however, the use of two suction cups is particularly desirable due to the overall design utilizing two fasteners 22 and 24 to hold all eleemnts, i.e. cover panel 14, handle 16 and suction cups 18 and 20, in assembly.

The suction cups 18 and 20 may include threaded inserts 26 and 28 bonded axially within the bases of suction cups 18 and 20. The threaded fasteners 22 and 24 can then be inserted through opposite ends of handle 16 and suitable holes through cover panel 14 for secure engagement within inserts 26 and 28. It should also be noted that tightening of fasteners 22 and 24 will tend to draw suction cups 18 and 20 against the underside of cover panel 14, this providing an effective seal against air passage.

Cover panel 14 may be formed from any suitable material, either metal or plastic, opaque or transparent, but it is contemplated to form cover panel 14 from transparent plastic because such materials are less expensive and more readily workable, and the transparent quality tends to lend aesthetic appeal. It is desirable that the material have good heat insulation properties and the coefficient of expansion of certain materials should be considered. Too great an expansion characteristic will tend to reduce desirability, this property becomes an important consideration since the protection device 10 will generally be employed in extreme cold weather.

Figures 3, 4:
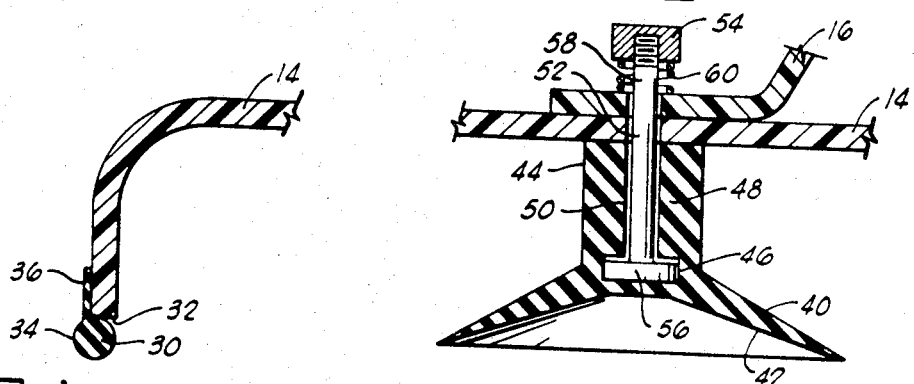
FIG. 3 is a sectional view of an edge portion of the protection device.
FIG. 4 is a vertical section through one form of releasable suction cup which may be employed in the present invention.

The sectional view of FIG. 3 shows an alternative of construction which may be desirable, especially for improving protective operation with more radically curved windshields. Thus, a bead portion 30 is adapted to encircle completely around a contacting edge 32 of the cover panel 14. The bead 30 may be formed from a suitable resilient material such as rubber or soft plastic and its cross sectional shape may be such that it has a bead 34 extending outward into a flap 36. The flap 36 can then be employed for bonding as by suitable glue or adhesive material to the outer side of cover panel 14 adjacent contacting edge 32. The inclusion of bead 30 will tend to impart a high degree of sealing capability to the protection device 10.

FIG. 4 shows a specific form of structure which includes suction release mechanism. Thus, a suction cup 40 is formed with its adhering surface 42 continuous, and with its base end 44 formed with a recess portion 46 which is partially enclosed by an annular shoulder portion 48 which defines a more narrow upper opening 50. A plunger 52 having enlarged upper and lower ends 54 and 56 is then disposed with the lower end within said recess portion 46 while a rod-like mid-portion 58 of plunger 52 passes through said upper opening 50 of suction cup 40, cover panel 14 and handle 16 for termination as the enlarged upper end 54. The upper end 54 may be formed as a threaded nut or such to be secured upon mid-portion 58 of plunger 52 to retain a compression spring 60 in bearing relationship against the upper surface of handle 16. Thus, pushing on handle 16 will only serve to force the total adhering surface 42 against the windshield in vacuum-adhering relationship, while release may be effected by thumb or forefinger depression of upper end 54 of plunger 52 to distend the center portion of adhering surface 42 a sufficient amount to break its vacuum-adhering capability.

Figure 5:
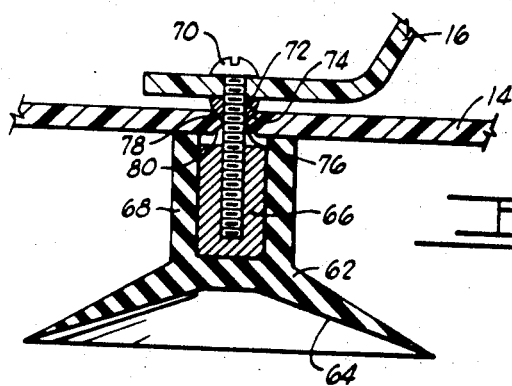
FIG. 5 is a vertical section through another alternative form of releasable suction device which may be employed in the present invention.

FIG. 5 shows still another form of suction assembly which includes vacuum releasing structure. A suction cup 62 having a vacuum-adhering surface 64 is formed with a threaded insert 66 bonded axially within suction cup base 68. A bolt 70 is inserted down through handle 16 and threaded through a nut 72 having a beveled underside 74, the lower portion of bolt 70 then being securely threaded within suction cup inserts 66. The cover panel 14 is formed with a receiving hole 76 having chamfered upper edge 78 and lower edge 80 to form what is effectively a knife-edge type of passage. The assembly then allows a function such that direct pressure on handle 16 tends merely to force suction cup 62 into vacuum-adhering disposition on the windshield, and release is effected by rocking handle 16 such that base end 68 of suction cup 62 is moved to distend suction cup 62 to break any vacuum sealed thereby.

In operation, the protector device 10 can be stored in an out-of-the-way spot in any standard automobile, e.g. under the drivers seat, and it can be readily utilized whenever it is necessary to park the automobile outdoors and in the environment of snow, ice or such. On parking the auto, the driver need only remove the protective device from its storage disposition and place it on the windshield 12 over a selected viewing area. Straight-down depression of handle 16 should result in rigid adherence of the cover panel 14 to the windshield 12. Thus, the contacting edge 32 will generally follow the contour of windshield 12 to give a sufficient degree of sealing. It may be noted that bead 30 can be employed, to effect a very high degree of sealing. Also, the various suction cup connections each tend to provide an effective air seal about their fastening holes at respective points on cover panel 14. A sufficient degree of air sealing plus the desirable heat insulating properties of the material employed as cover panel 14 will tend to preserve a clear, de-iced windshield area in even the most severe weather conditions.

The foregoing discloses a windshield protection device which is inexpensive yet rugged of construction and which is easily operated for placement on a windshield area. While certain materials and construction techniques are alluded to in the specification, it should be understood that selected ones from a broad class of materials may be employed in construction, and various fastening and forming techniques other than those specifically enumerated might be utilized. The use of a protection device such as disclosed herein will contribute to public safety by eliminating situations where automobiles might be driven with galzed winshields having various peripheral blind spots. The device can be made available at low cost and carried at all times in an automobile, truck or other moving vehicle for periodic usage as required.

Changes may be made in the combination and arrangement of elements as heretofore set forth in the specification and shown in the drawings; it being understood that changes may be made in the embodiments disclosed without departing from the spirit and scope of the invention as defined in the following claims.

What is claimed is:
1. A protector device for use with a windshield surface which is normally exposed for deposit of snow or sleet and the like, comprising:
   cover panel means having a planar panel surrounded by edge portion which terminates in a contacting edge for placement in contact with said windshield surface, said cover panel means defining a closed volume adjacent said windshield surface;
   handle means secured to the outside of said cover panel means at a generally central position on said planar panel;
   first and second suction cups each having a base end and a cup end and each having its base end disposed on the inside of said cover panel means at centrally spaced positions;
   first and second recessed portions formed within the base end of each of said first and second suction cups, said recessed portions having annular shoulder defining an upper opening;
   first and second plunger means each having a body portion and upper and lower ends of enlarged cross-section, said first and second plunger means each being disposed through said handle means, said cover panel means, and said upper opening of respective first and second suction cups with the plunger means lower end retained in the respective recessed portion below said annular shoulder and the plunger means upper end disposed above said handle means; and
   first and second spring means disposed on a respective one of said body portions of said first and second plunger means and bearing between said handle means and the plunger means upper end.
2. A protector device as set forth in claim 1 which is further characterized to include:
   bead means formed of resilient material and secured around said contacting edge for engagement with said windshield surface.

References Cited
UNITED STATES PATENTS

| 1,119,177 | 12/1914 | Krafft | 248—206 X |
| 1,783,861 | 12/1930 | Thiem. | |
| 2,489,901 | 11/1949 | Kocinski | 296—84 |
| 2,558,817 | 7/1951 | Bryant | 296—84 |

LEO FRIAGLIA, Primary Examiner
J. A. PEKAR, Assistant Examiner